United States Patent [19]
Yates

[11] Patent Number: 5,107,965

[45] Date of Patent: Apr. 28, 1992

[54] VEHICLE FRICTION BRAKES

[75] Inventor: Adam Yates, Newcastle-upon-Tyne, England

[73] Assignee: Athlone Developments Ltd., London, England

[21] Appl. No.: 617,207

[22] Filed: Nov. 23, 1990

[30] Foreign Application Priority Data

Nov. 24, 1989 [GB] United Kingdom ............... 8926617

[51] Int. Cl.$^5$ ............................................... B62L 3/00
[52] U.S. Cl. .............................. 188/24.22; 188/24.11; 188/73.1
[58] Field of Search ............... 188/24.11, 24.12, 24.13, 188/24.22, 73.1, 250 G, 250 B

[56] References Cited

U.S. PATENT DOCUMENTS

| | | | |
|---|---|---|---|
| 1,781,074 | 11/1930 | Norton | 188/250 G |
| 3,868,002 | 2/1975 | Babled | 188/73.1 |
| 4,230,208 | 10/1980 | Gale | 188/73.1 |
| 4,231,451 | 11/1980 | Fujii | 188/73.1 |
| 4,315,563 | 2/1982 | Hayashi et al. | 188/250 G X |
| 4,391,352 | 7/1983 | Brown | 188/24.12 |

FOREIGN PATENT DOCUMENTS

| | | | |
|---|---|---|---|
| 294547 | 2/1954 | France | 188/73.1 |
| 0638282 | 12/1978 | U.S.S.R. | 188/73.1 |
| 2049078 | 12/1980 | United Kingdom | 188/250 B |
| 2146717 | 4/1985 | United Kingdom | 188/24.11 |

Primary Examiner—Robert J. Oberleitner
Assistant Examiner—Peter M. Poon
Attorney, Agent, or Firm—Watson, Cole, Grindle & Watson

[57] ABSTRACT

A component for use in conjunction with a bicycle brake member or block, being arranged to contact a bicycle wheel rim in advance of the brake block as the brake is applied, so as to clean the wheel rim of water and/or dirt to improve braking performance. The component may be formed integrally with the brake block or separately for attachment thereto. The component includes a scraper element, whose end surface is arranged to contact the wheel rim. The scraper element is connected to the main body of the component by a flexible hinge portion, which allows the scraper element to flex about the hinge portion, so that as the brake is applied to bring the brake block into contact with the wheel rim, the scraper element flexes against the bias of the hinge portion to bias the scraper element into contact with the wheel rim. The scraper element, hinge portion and main body are all formed integrally of plastic material, preferably injection molded in glass-reinforced nylon.

20 Claims, 4 Drawing Sheets

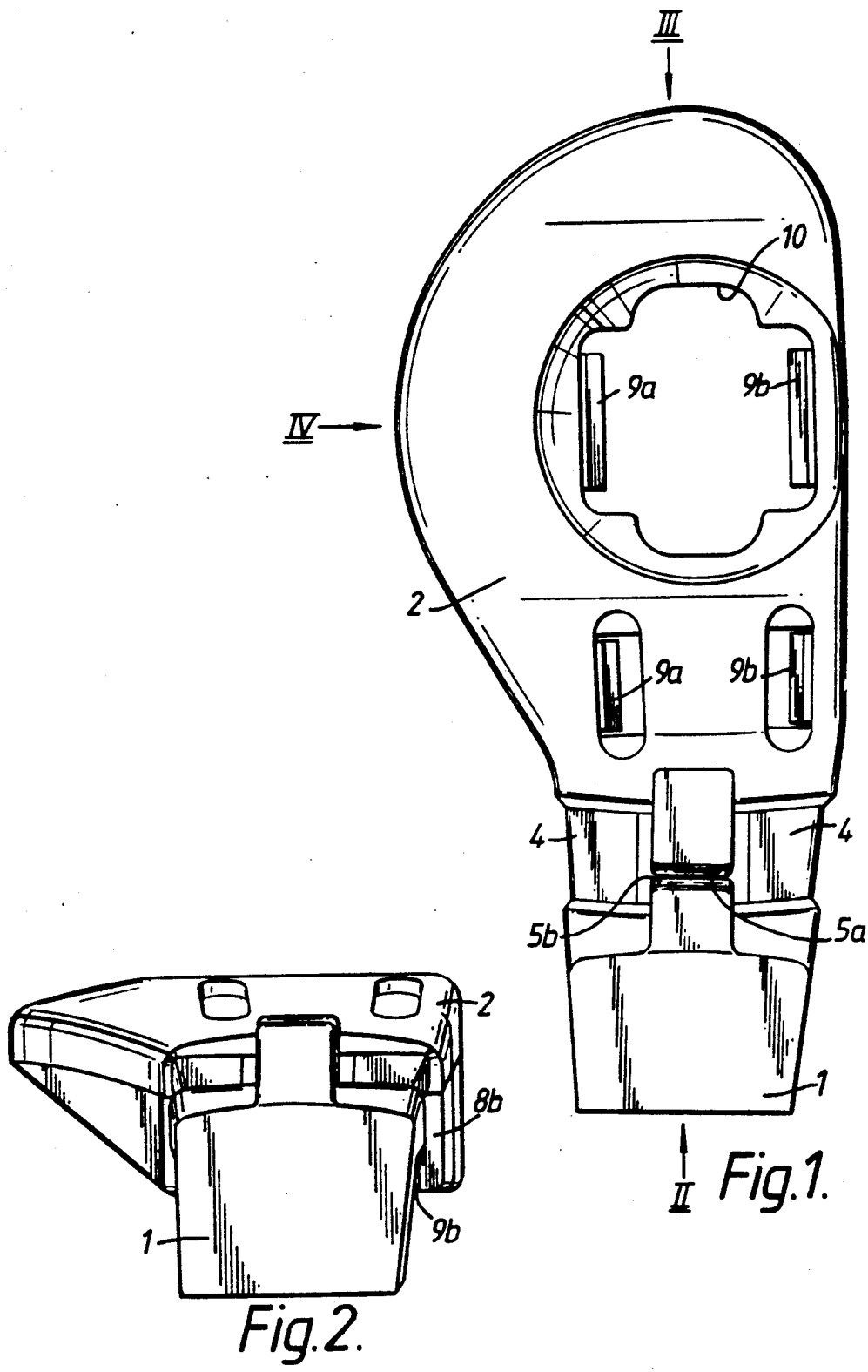

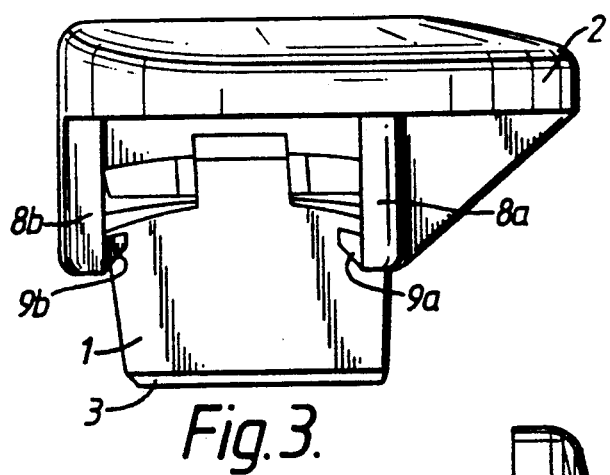
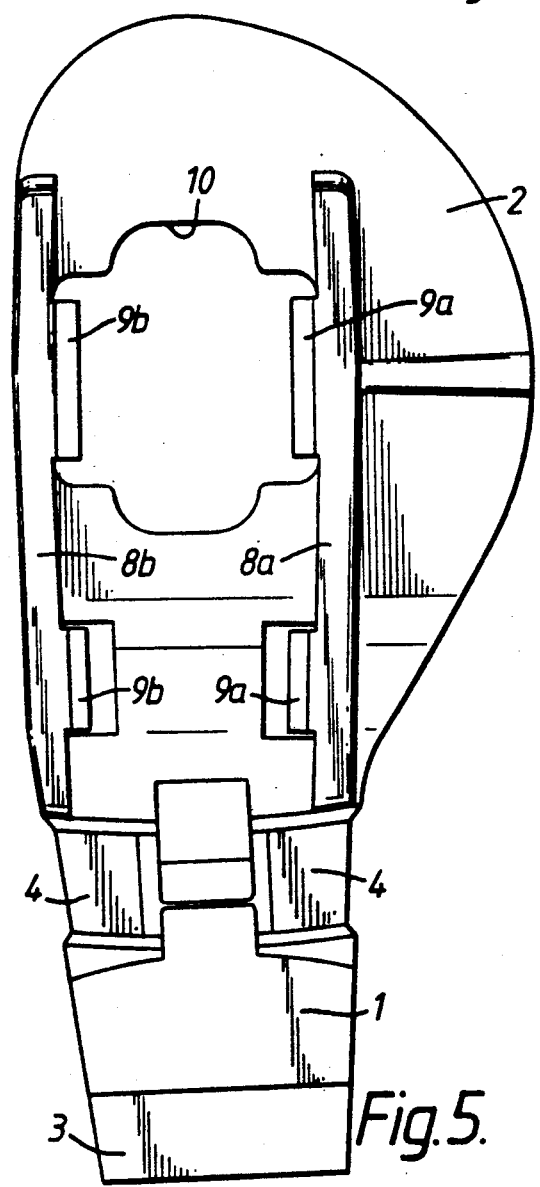
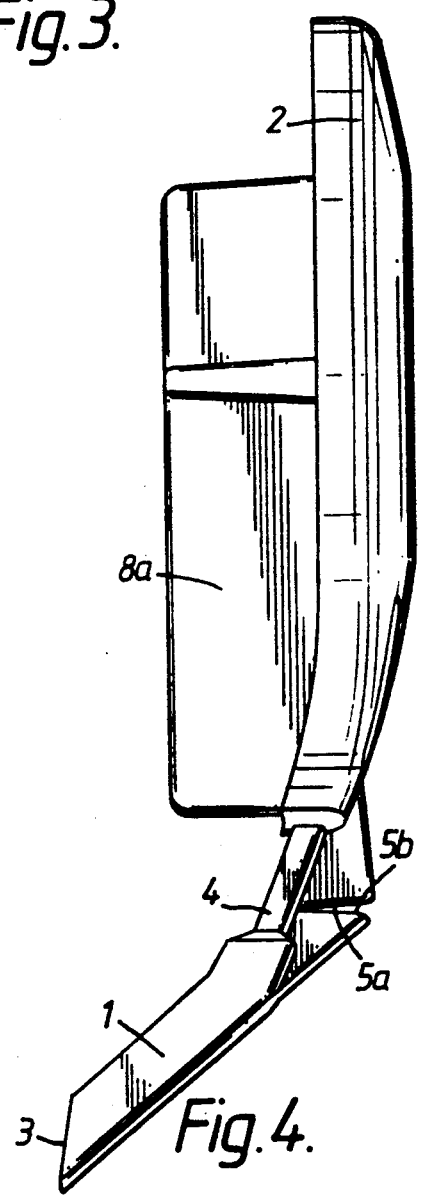

VEHICLE FRICTION BRAKES

BACKGROUND AND SUMMARY OF THE INVENTION

This invention relates to vehicle friction brakes and particularly, but not exclusively, to such brakes for bicycles.

When driving or riding a vehicle in wet or dirty conditions, water or dirt on one or more of the braking surfaces can cause a significant reduction in braking efficiency.

According to one aspect of the present invention, there is provided a component for a vehicle friction brake comprising a main body, a scraper element, and a flexible hinge portion connecting the main body to the scraper element, the main body, scraper element and hinge portion being formed integrally of plastic material, the scraper element being adapted to flex about the hinge portion between a rest position and a deflected position in which the hinge portion acts to bias the scraper element towards the rest position, the scraper element being adapted to be arranged to contact a surface of a member to be braked upstream of a braking member of the brake and, in the rest position and upon initial operation of the brake, to move into contact with the surface before the braking member contacts the surface and, upon further operation of the brake, as the braking member is moved into contact with the surface, to flex against the bias of the hinge portion to bias the scraper element into contact with the surface of the member to be braked.

The scraper element and the main body are advantageously substantially rigid, with flexing being confined to the hinge portion in the deflected position of the scraper element.

A portion at least of the scraper element may be adapted to be arranged to extend both towards the surface of the member to be braked and in a direction upstream of the braking member of the brake. The scraper element may comprise an end portion which is inclined relative to the direction of extent of the scraper element to form an apex at the leading edge of the scraper element end surface.

This scraper element end surface may be generally planar and adapted to be arranged to be generally parallel to the surface of the member to be braked as the brake is operated. At least a portion of this end surface may be arranged to extend beyond the plane of the operative surface of the braking member towards the surface of the member to be braked.

The scraper element may be adapted to be arranged to flex in a direction away from the surface of the member to be braked when the brake is further operated.

Stop means are preferably provided on at least one of the scraper element and the main body for limiting flexing of the scraper element about the hinge portion. These stop means advantageously comprise two projections associated with the hinge portion, the projections being arranged to have a gap therebetween in the rest position of the scraper element and to be brought into abutment in the fully deflected position of the scraper element.

The main body preferably forms a mounting member for mounting the component on the brake.

The material of the hinge portion may be of reduced thickness relative to the adjoining material of the main body and the scraper element.

The component may form part of the braking member. Alternatively, the component may be provided separately of the braking member and be adapted for attachment to the braking member to move with the braking member towards the surface of the member to be braked as the brake is operated. Means for attaching the component to the braking member or brake may comprise two walls integrally formed with the main body and depending from the main body to form a generally U-shaped channel adapted to receive at least a part of the braking member. Preferably one or more projections is provided on the walls, projecting into the channel and arranged, in use, to engage the braking member to assist attachment of the component to the braking member.

Where a portion of the main body forms a base to the channel, the portion may be apertured to allow securing means, for securing the braking member to the brake, to pass therethrough. This aperture is preferably shaped to conform generally to the shape of the base of the securing means to provide additional location of the component relative to the braking member.

According to a further aspect of the present invention, there is provided a braking apparatus for a vehicle friction brake comprising a braking member and a component in accordance with the above-recited first aspect of the present invention.

According to a yet further aspect of the present invention, there is provided a vehicle friction brake comprising a brake caliper, each arm portion of the caliper being provided with at least one braking apparatus in accordance with the above-recited further aspect of the present invention, wherein the braking member of each braking apparatus is attached to its respective caliper arm portion.

An embodiment of the invention will now be described, by way of example only, with reference to the accompanying drawings.

BRIEF DESCRIPTION OF THE DRAWINGS

FIG. 1 is a top plan view of a brake component in accordance with a first aspect of the present invention;

FIG. 2 is an end elevation in the direction of arrow II in FIG. 1;

FIG. 3 is an end elevation in the direction of arrow III in FIG. 1;

FIG. 4 is a side elevation in the direction of arrow IV in FIG. 1;

FIG. 5 is an underneath plan view of the component of FIG. 1;

DETAILED DESCRIPTION OF THE PREFERRED EMBODIMENT

Figure 6:
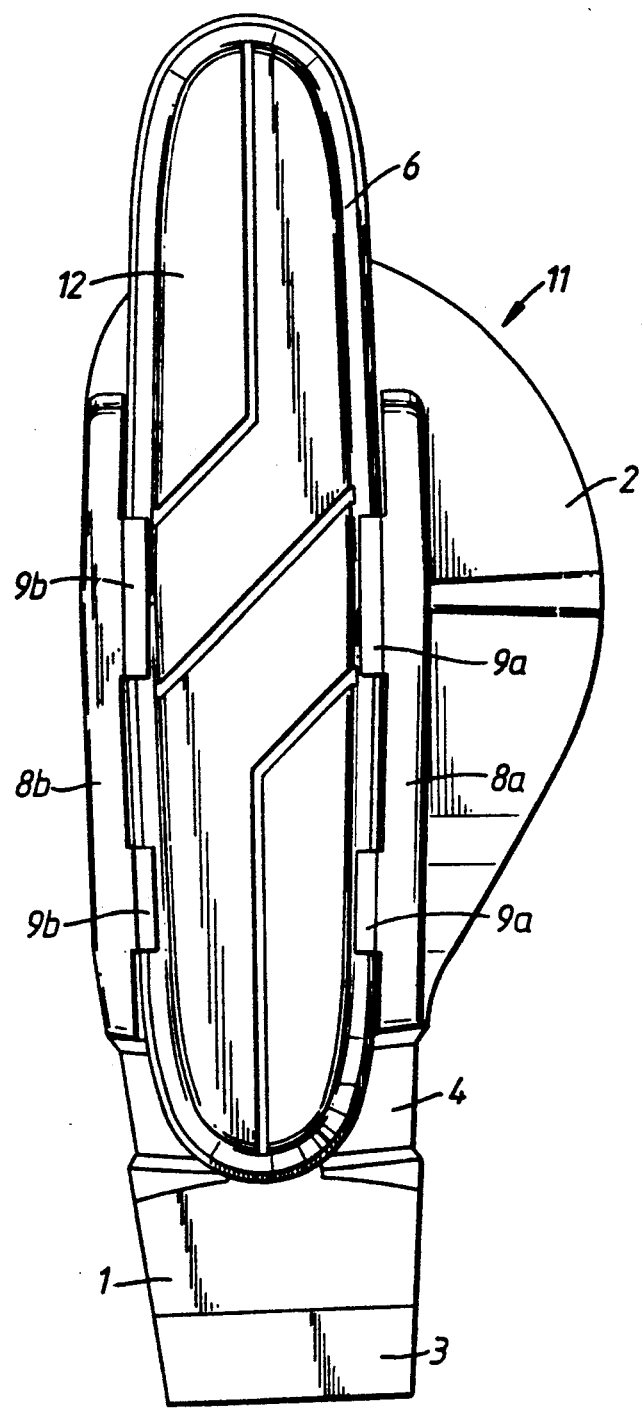
FIG. 6 is a view similar to that of FIG. 5, showing the component fitted to a braking member.

An embodiment of a component according to the present invention is shown in FIGS. 1-5. The component comprises a scraper element 1 and a main body 2. At the junction between the main body 2 and the scraper element 1, a flexible hinge portion 4 of reduced material thickness is provided, to act as a hinge about which the scraper element may flex relative to the main body 2 between a rest position and a deflected position in which the hinge portion acts to bias the scraper element towards the rest position. The scraper element, main body and hinge portion are made integrally of plastic material and may for example be molded of a glass reinforced nylon material. Other plastic materials with the required resilient deformation characteristics for the hinge portion may, however, equally be used. The scraper element and main body are advantageously substantially rigid, with flexing being confined to the hinge portion in the deflected position of the scraper element.

The free end of the scraper element 1 is provided with a generally planar end surface 3 which is adapted so that in use it is generally parallel to the surface of the member to be braked, as will later be described.

To limit the maximum amount by which the scraper element 1 may flex about the hinge portion 4 relative to the main body 2, stop means may, as shown, be provided in the form of projections 5a, 5b, on both the scraper element and main body, overlapping the hinge portion 4. In the rest position of the scraper element (as illustrated), a gap exists between mutually facing surfaces of the projections 5a, 5b, which gap is reduced and closed when the projections are brought into abutment in the fully deflected position (not shown) of the scraper element.

In the illustrated embodiment, the component is provided separately of the braking member 6, although it may be provided integrally with the braking member 6. In the illustrated embodiment, the component is adapted for attachment to the braking member 6, with the braking member 6 being secured to the brake caliper by a securing means 7 such as a threaded shank, so that upon operation of the brake, both the component and its associated braking member 6 move as one towards the surface of the member to be braked (not shown).

Figure 7:
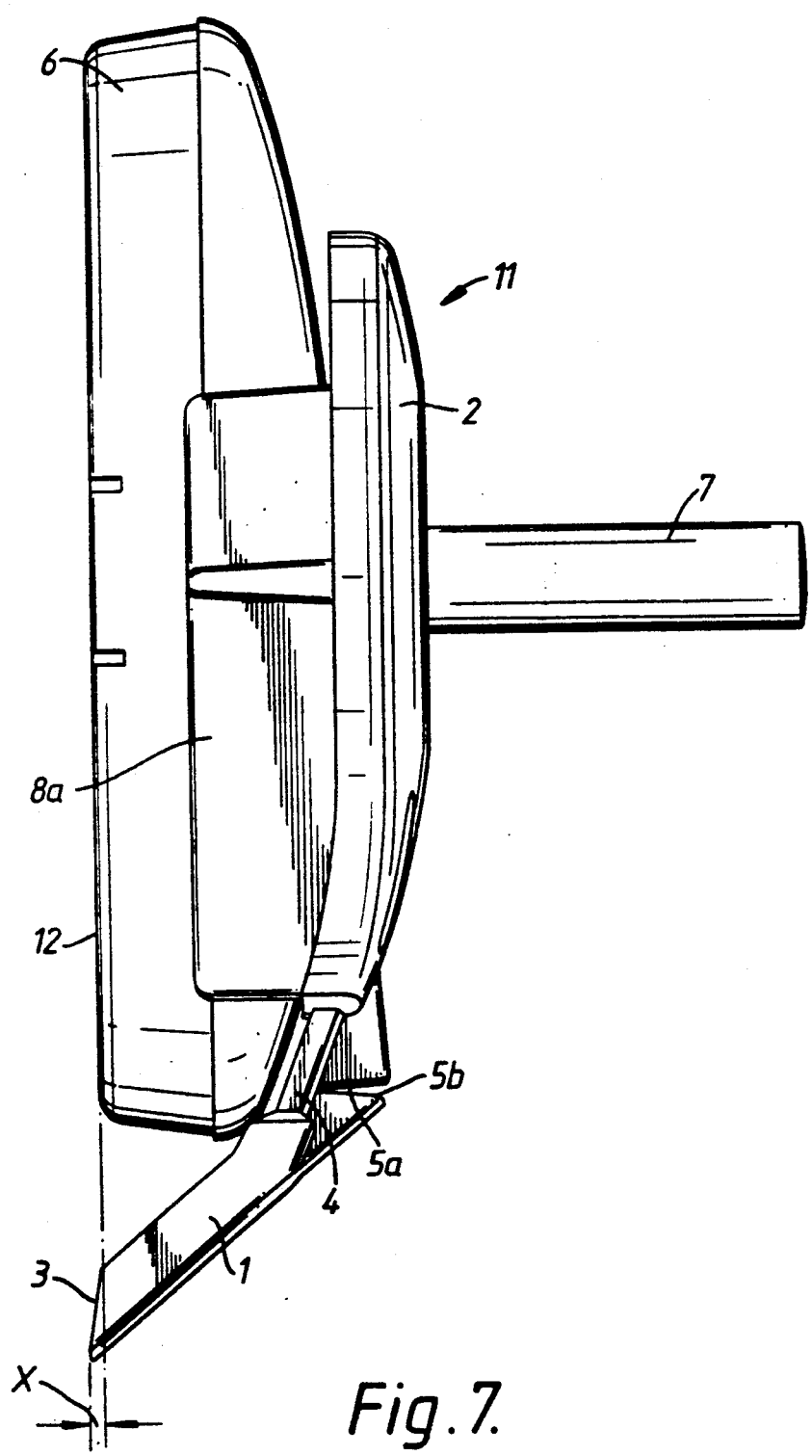
FIG. 7 is a view similar to that of FIG. 4, showing the component fitted to a braking member

To attach the component to the braking member 6, attachment means in the form of two walls 8a, 8b, are provided, integrally formed with and depending from the main body 2 to form a generally U-shaped channel for receiving the braking member 6, as shown in FIGS. 6 and 7. Two projections 9a, 9b, are provided on the inwardly facing surfaces of the walls, projecting into the channel, to engage, in the illustrated embodiment, under a ridge provided around the braking member 6.

To further locate the component relative to the braking member, the aperture 10 provided in the portion of the main body 2 forming the base of the channel and through which the securing means 7 extends, may be shaped to conform generally to the shape of the base of the securing means. In the illustrated embodiment, at the base of the securing means 7 there is provided an oblong boss (not shown) and the aperture 10 is correspondingly shaped. In securing the assembly of the brake member 6 and component (see FIGS. 6 and 7) to the brake caliper (not shown), the portion of the main body 2 around the aperture 10 may be clamped securely between the braking member 6 and the brake caliper.

As shown in FIG. 7, the component is assembled with the braking member so that the end surface 3 of the scraper element 1 extends beyond the plane of the operative surface 12 of the braking member 6, towards the surface of the member to be braked (not shown) with the extreme tip of the end surface 3 extending beyond the plane of surface 12 by a distance X. In the illustrated embodiment the operative surface of the member to be braked may, for example, be the rim of a bicycle wheel or a brake disc, and the braking member a brake block or pad. Accordingly, when the brake is operated and the assembly 11 moves in the direction of the wheel rim, the end surface 3 will contact the wheel rim before the surface 12 contacts the wheel rim. Initially the extreme tip of surface 3 contacts the wheel rim and the continued operation of the brake causes the scraper element 1 to flex about hinge portion 4, against the bias of the hinge portion, to bias the surface 3 into contact with the wheel rim, until the braking surface 12 moves into contact with the rim to provide the required braking effect. The scraper element 1 is, in use, positioned upstream of the braking surface 12 so that the action of the scraper element 1 contacts the wheel rim to clear unwanted water and/or dirt from the surface of the wheel rim before the wheel rim rotates past braking surface 12, to hence increase the braking efficiency. Advantageously, as shown, the scraper element is arranged to extend both towards the wheel rim surface and in a direction upstream of the braking surface 12, and with the end surface 3 inclined relative to the direction of extent of the scraper element, to form an apex at the leading edge of the scraper element end surface, to act like a knife blade to lift dirt from the wheel rim surface.

The stop means 5a, 5b may be arranged so that they will only be brought into abutment in the later stages of wear of the braking member, to prevent the scraper element 1 breaking.

Although illustrated and described in relation to a friction brake suitable for a bicycle, it should be appreciated that this invention is not intended to be limited to bicycle brakes, but is applicable to friction brakes for other sorts of vehicles.

I claim:

1. A component for a vehicle friction brake comprising a main body, a scraper element, and a flexible hinge portion connecting said main body to said scraper element, said main body, scraper element and hinge portion being formed integrally of plastic material, said scraper element being substantially rigid and adapted to move about said hinge portion between a rest position and a deflected position in which said hinge portion flexes and biases said scraper element towards said rest position, said hinge portion comprising an area of reduced material bulk relative to the adjoining material of said scraper element, such that flexing is substantially confined to said hinge portion during movement of said scraper element to said deflected position, and said scraper element having a surface contacting portion being arranged to contact a surface of a member to be braked upstream of a braking member of the brake and, in said rest position and upon initial operation of the brake, to move into contact with the surface before the braking member contacts the surface and, upon further operation of the brake, as the braking member is moved into contact with the surface, to flex against the bias of said hinge portion to bias said scraper element into contact with the surface of the member to be braked said surface contacting portion being made of said plastic material.

2. The component as claimed in claim 1, wherein said main body is substantially rigid.

3. The component as claimed in claim 1, wherein a portion of said scraper element is adapted to be arranged to extend both towards the surface of the member to be braked and in a direction upstream of the braking member of the brake.

4. The component as claimed in claim 3, wherein said scraper element comprises an end surface which is inclined relative to the direction of extent of said scraper element to form an apex at the leading edge of said scraper element end surface.

5. The component as claimed in claim 4, wherein said scraper element end surface is generally planar and is adapted to be arranged to be generally parallel to the surface of the member to be braked as the brake is operated.

6. The component as claimed in claim 5, wherein at least a portion of said generally planar end surface is arranged to extend beyond the plane of the operative surface of the braking member towards the surface of the member to be braked.

7. The component as claimed in claim 1, wherein said scraper element is adapted to be arranged to flex in a direction away from the surface of the member to be braked when the brake is further operated.

8. The component as claimed in claim 1, wherein said main body forms a mounting member for mounting the component on the brake.

9. The component as claimed in claim 1, wherein stop means are provided on at least one of said scraper element and said main body for limiting movement of said scraper element about said hinge portion.

10. The component as claimed in claim 9, wherein said stop means comprises two projections associated with the hinge portion, said projections being arranged to have a gap therebetween in said rest position of said scraper element and to be brought into abutment in the fully deflected position of said scraper element.

11. The component as claimed in claim 1, wherein the material of said hinge portion is of reduced thickness relative to the adjoining material of said main body and said scraper element.

12. The component as claimed in claim 1, wherein the component is provided separately of the braking member and is adapted for attachment to the braking member to move with the braking member towards the surface of the member to be braked as the brake is operated.

13. The component as claimed in claim 12, wherein means are provided for attaching the component to the braking member, said means comprising two walls integrally formed with said main body and depending from said main body to form a generally U-shaped channel adapted to receive at least a part of the braking member.

14. The component as claimed in claim 13, wherein at least one projection is provided on said walls, projecting into said channel and arranged, in use, to engage the braking member to assist attachment of the component to the braking member.

15. The component as claimed in claim 13, wherein a portion of said main body forms a base to said channel and is apertured to allow securing means for securing the braking member to the brake to pass therethrough.

16. The component as claimed in claim 15, wherein said aperture is shaped to conform generally to the shape of the base of the securing means to provide additional location of the component relative to the braking member.

17. The component as claimed in claim 12, including means for attaching the component to a brake.

18. The component as claimed in claim 17, wherein said main body is apertured to enable securing means for securing the braking member to the brake to pass therethrough.

19. A braking apparatus for a vehicle friction brake, comprising; a component for a vehicle friction brake comprising a main body, a scraper element, and a flexible hinge portion connecting said main body to said scraper element, said main body, scraper element and hinge portion being formed integrally of plastic material, said scraper element being substantially rigid and adapted to move about said hinge portion between a rest position and a deflected position in which said hinge portion flexes and biases said scraper element towards said rest position, said hinge portion comprising an area of reduced material bulk relative to the adjoining material of said scraper element, such that flexing is substantially confined to said hinge portion during movement of said scraper element to said deflected position, and said scraper element having a surface contacting portion being arranged to contact a surface of a member to be braked upstream of a braking member of the brake and, in said rest position and upon initial operation of the brake, to move into contact with the surface before the braking member contacts the surface and, upon further operation of the brake, as the braking member is moved into contact with the surface, to flex against the bias of said hinge portion to bias said scraper element into contact with the surface of the member to be braked said surface contacting portion being made of said plastic material; and a braking member attached to said main body.

20. A component for a vehicle friction brake comprising a main body, a scraper element, and a flexible hinge portion connecting said main body to said scraper element, said main body, scraper element and hinge portion being formed integrally, said scraper element being adapted to flex about said hinge portion between a rest portion and a deflected position in which said hinge portion acts to bias said scraper element towards said rest position, stop means in the form of projections provided on said scraper element and said main body for limiting flexing of said scraper element about said hinge portion, said projections being arranged to have a grasp therebetween in said rest position of said scraper element nd to be brought into abutment in the fully deflected position of said scraper element, said scraper element being adapted to be arranged to contact a surface of a member to be braked upstream of a braking member of the brake and, in said rest position and upon initial operation of the brake, to move into contact with the surface before the braking member contacts the surface and, upon further operation of the brake, as the braking member is moved into contact with the surface, to flex against the bias of said hinge portion to bias said scraper element into contact with the surface of the member to be braked.

* * * * *